J. SEYMOUR.
Butter Worker.
No. 2,776.
Reissued Oct. 15, 1867.
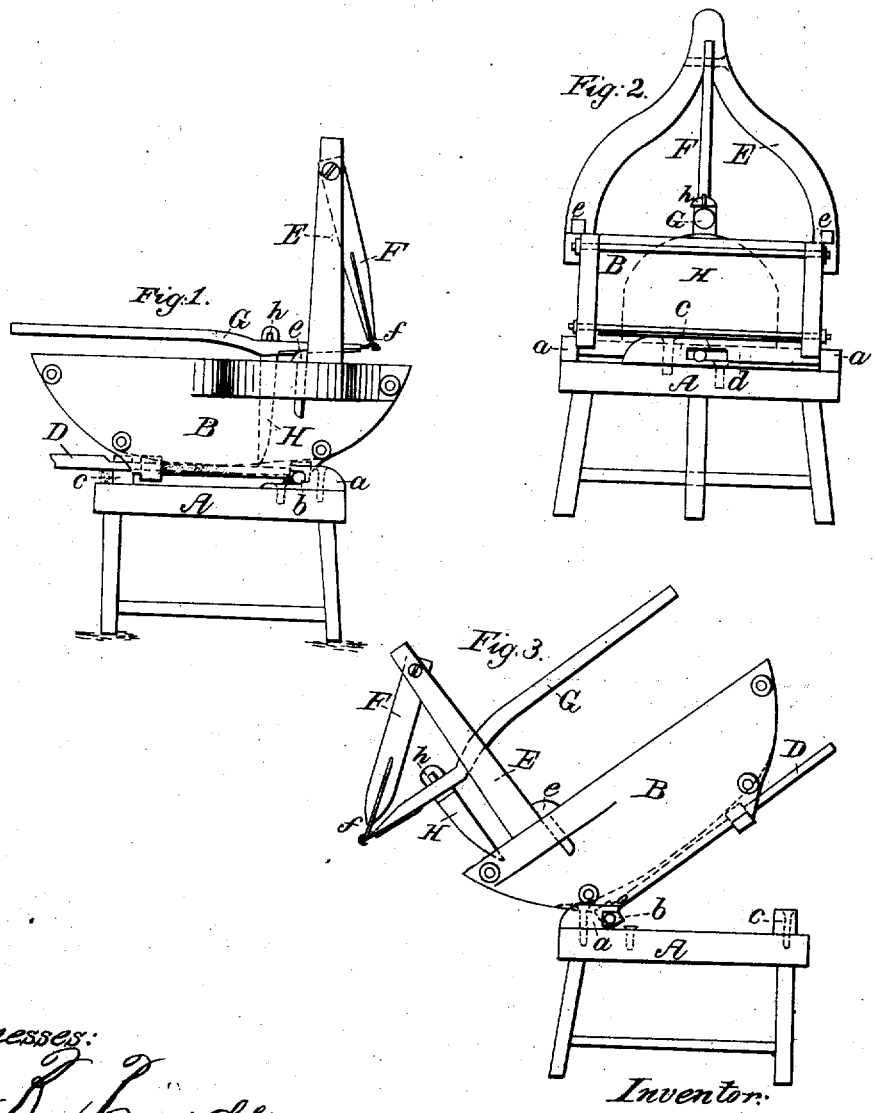
Witnesses:
A. B. Snider
Samuel Lewis
Inventor:
Josiah Seymour
N. PETERS. Photo-Lithographer. Washington, D. C.

United States Patent Office.

J. P. CORBIN, OF WHITNEY'S POINT, NEW YORK, ASSIGNEE BY MESNE ASSIGNMENTS OF JOSIAH SEYMOUR.

*Letters Patent No.* 26,527, *dated December* 20, 1859; *reissue No.* 2,776, *dated October* 15, 1867.

IMPROVEMENT IN WORKING BUTTER.

The Schedule referred to in these Letters Patent and making part of the same.

TO ALL WHOM IT MAY CONCERN:

Be it known that JOSIAH SEYMOUR, of Coventry, in the county of Chenango, and State of New York, hath invented a new and improved Butter-Worker; and I, J. P. CORBIN, of Whitney's Point, in the county of Broome, and State of New York, assignee of said JOSIAH SEYMOUR, do hereby declare that the following is a full, clear, and exact description thereof, which will enable others skilled in the art to make and use the same, reference being had to the accompanying drawings, forming part of this specification.

The nature of my invention consists in making a tray, the bottom forming the section of a circle, mounted upon a table or platform, having an axle about one-third of its distance from the back end, to allow it to tip sufficient to drain off the fluids in cleansing, also the arch and fixtures for working the butter. The invention also consists in an improved butter-working apparatus, hereinafter fully shown and described.

To enable others skilled in the art to make and use my invention, I will proceed to describe its construction and operation.

Figure 1 represents a side elevation in the right position for working.

Figure 2 shows an end view.

Figure 3 is a side elevation, with the tray tipped up to allow the fluids to drain off.

Similar letters of reference indicate like parts.

The table or platform A may be made of plank of suitable width and strength to support firmly the tray B, and is mounted on three legs, braced together with rounds in the usual way. To the top of the platform A are secured on each side open clasp-boxes *d d*, which form the bearings for the axle *b b*, which holds the tray B to the top of the platform. Near the front end of the table A is another similar clasp, *c*, placed at a right angle, and serves as a clutch to hold the tray firmly in position by the movable handle D, the rear end being turned into the centre of the axle-bar *a*, about one-fourth of the distance from the back end of the tray B. On the top edge is an elevated frame, E, in the form of a Gothic arch. In the centre hangs a rod or pendulum, F, having a small eye, *f*, in the lower end, into which a hook on the end of a handle, G, is hitched. The arch frame E is tenoned on both sides of the tray B, and is mortised to receive the tenons, and the frame is secured firmly by two wood keys C C, and may be easily removed when desired. The butter-worker H is made of hard, clean wood, in the form of a wedge, slightly rounded on the side which is back, for the purpose of spreading the butter in a thin sheet to receive the salt upon it. The butter-worker H is framed into the handle G, and is held in by a key, *h*.

The advantages of my invention for working and salting butter will be readily seen, and the operation easily understood, the process not requiring one-half of the time, strength, or labor of the usual method, is more cleanly, every impurity is freed and drained off, and the tray and fixtures are so easily detached that they may be cleansed in the most thorough manner. I also do away with the necessity of a bowl in which to wash the butter, mine being a bowl and worker combined, thereby saving the time and expense in cleaning and keeping in repair two apparatuses, as has been the case heretofore.

What I claim as new, and desire to secure by Letters Patent, is—

1. A vibrating rod, F, handle G, and butter-worker H, combined and arranged to operate as shown, or in an equivalent manner, for the purpose set forth.

2. The combination of the tray B with the butter-working apparatus, arranged for joint operation substantially as shown and described.

3. The manner of tipping the tray or bowl to drain off the fluids, also of securing it to the table or frame for the purpose set forth.

J. P. CORBIN.

Witnesses:

WM. F. MCNAMARA,

ALEX. F. ROBERTS.